RECEIVER NOISE CANCELLATION SYSTEM

Inventor
ORVILLE M. ENESS
BY Mueller, Aichele & Rauner
ATTYS.

RECEIVER NOISE CANCELLATION SYSTEM

Filed Sept. 7, 1967 4 Sheets-Sheet 2

Inventor
ORVILLE M. ENESS

BY Mueller, Aichele & Rauner

ATTYS.

Dec. 1, 1970 O. M. ENESS 3,544,904

RECEIVER NOISE CANCELLATION SYSTEM

Filed Sept. 7, 1967 4 Sheets-Sheet 3

Inventor
ORVILLE M. ENESS
BY Mueller, Aichele & Rauner
ATTYS.

Inventor
ORVILLE M. ENESS
BY Mueller, Aichele & Rauner
ATTYS.

3,544,904

RECEIVER NOISE CANCELLATION SYSTEM

Orville M. Eness, Park Ridge, Ill., assignor to Motorola, Inc., Franklin Park, Ill., a corporation of Illinois Filed Sept. 7, 1967, Ser. No. 666,019
Int. Cl. H04b *1/10*
U.S. Cl. 325—476 10 Claims

ABSTRACT OF THE DISCLOSURE

In a communications receiver an impulse noise spectrum cancellation system develops a cancellation signal in response to impulse noise. The cancellation signal is reversed in phase and of the same amplitude as the impulse noise disturbance and is mixed with the impulse noise disturbance to cancel it. The use of a cancellation signal reduces the magnitude of the impulse noise disturbance without developing sideband splatter.

BACKGROUND OF THE INVENTION

It is well known that impulse noise disturbances which are superimposed on a carrier wave signal can seriously impair the translation of the desired signal within a radio receiver. The problem may be particularly critical in mobile communications equipment where impulse noise energy from ignition systems, high voltage leakage, lightning flashes and the like is coupled to a highly sensitive receiver and appears as undesirable audio output. It may be further aggravated if the receiver is operating in a fringe area where the level of strength of the desired carrier wave signal is relatively weak. Many types of devices are known for minimizing or limiting such noise disturbances. These systems detect noise pulses in early stages of the receiver and remove the effect of the noise pulses by interrupting the signal conduction at a point preceding the relatively high selectivity portion of the receiver. The system of the present invention is an improvement over devices of this type and overcomes a problem which has arisen in prior systems.

One such problem occurs in the operation of a radio receiver when an undesired signal of nearly the same frequency as the desired signal may be present. Selectivity to filter out the undesired signal is provided by the intermediate frequency stages thus the signal which is not desired is present in the receiver in the preceding radio frequency stages. However, if a noise blanker is used which turns off the radio frequency stage whenever a noise impulse is present in the stage, an undesirable form of interference known as modulation splatter may occur. In rapidly turning on and off the radio frequency stage of a receiver by means of blanking pulses, sidebands are generated through modulation of the undesired signals by the blanking pulses. These sidebands may be very close in frequency to the desired signal and within the passband of the intermediate frequency stages. In such cases the undesired sidebands will not be filtered out and will appear in the receiver output as interference.

SUMMARY

It is, therefore, an object of this invention to provide a radio receiver with an improved noise spectrum cancellation system.

Another object of this invention is to provide a radio receiver with an impulse noise spectrum cancellation system which does not develop modulation splatter.

In practicing this invention a signal wave receiver is provided which includes a receiver input portion for receiving the signal wave which may include impulse noise disturbances. Impulse noise detection means is coupled to the input portion and is responsive to an impulse noise disturbance to develop a control signal having a predetermined phase relationship to the impulse noise disturbance. Cancellation signal generation means is coupled to the impulse noise detection means and the receiver input portion and is responsive to the control signal and the impulse noise disturbance to generate a cancellation signal having substantially the same amplitude and frequency spectrum as the impulse noise disturbance. The cancellation signal further is substantially 180° out-of-phase with the impulse noise disturbance. Summing means is coupled to the input portion and the cancellation signal generation means for summing the impulse noise disturbance and the cancellation signal to thereby reduce the amplitude of the impulse noise disturbance.

The invention is illustrated in the drawings of which:

DESCRIPTION

Figure 1:
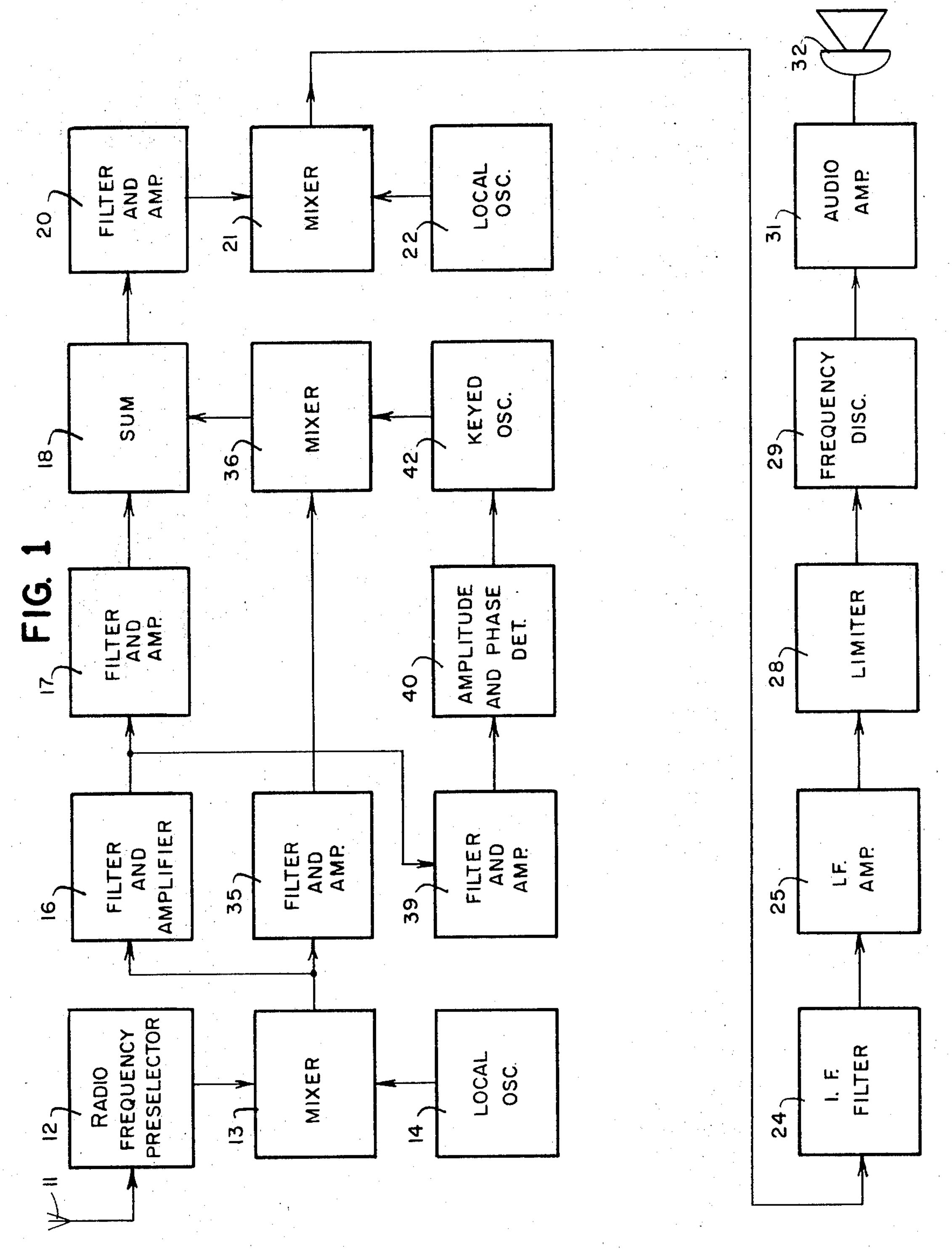
FIG. 1 is a block diagram of a radio receiver including the noise cancellation system of this invention.

In FIG. 1 there is shown a block diagram of a radio receiver incorporating the features of this invention. The signal wave which may be accompanied by impulse noise disturbances, is received by antenna 11 and amplified in radio frequency preselector 12. The output of radio frequency preselector 12 is mixed in mixer 13 with the signal from local oscillator 14. The resulting signal is coupled to filter and amplifier 16 and 17 and from there to summing circuit 18. The action of summing circuit 18 in reducing the impulse noise disturbances will be explained in a subsequent portion of this specification. The output of summing circuit 18 is coupled to filter and amplifier 20 and from there to mixer 21. The input signal to mixer 21 is mixed with a signal from local oscillator 22 to develop an intermediate frequency signal. The intermediate frequency signal is filtered in intermediate frequency filter 24 and amplified in intermediate frequency amplifier 25. The signal is further amplified in limiter 28 and detected in frequency discriminator 29. The audio signal from discriminator 29 is amplified in audio amplifier 31 and reproduced by speaker 32. While the receiver shown in FIG. 1 is a frequency modulation receiver the invention is not limited to this form of receiver.

The output of mixer 13 is also coupled to a filter and amplifier 35 which has a different passband than filter and amplifier 16. The passband of filter and amplifier 35 is chosen so that the signal wave is not present in filter and amplifier 35 but any impulse noise disturbance which is present in filter and amplifier 16 is also present in filter and amplifier 35. This is possible since the impulse noise disturbance has a very much wider bandwith than the signal wave.

The output signal from filter and amplifier 35 contains the information relative to the amplitude of the impulse noise signal and its duration and is coupled to mixer 36. The carrier wave signal and impulse noise disturbance accompanying it are also coupled from filter and amplifier 16 to amplitude and phase detector 40 through filter and amplifier 39. Since the impulse noise disturbances which cause interference problems are higher in magnitude than the desired signals, in the wideband portions of the receiver, amplitude and phase detector 40 can be set to be responsive only to impulse noise disturbances. The phase detector portion of amplitude and phase detector 40 acts to determine the phase of the impulse noise disturbance so that amplitude and phase detector 40 develops a control signal which has a predetermined phase relationship to the phase of the impulse noise disturbance.

The control signal from amplitude and phase detector 40 is coupled to keyed oscillator 42 to turn on the oscillator at the proper time so that the phase of the output signal from keyed oscillator 42 has a desired phase relationship to the phase of the desired signal. The frequency of the signal from keyed oscillator 42 is equal to the difference between the center frequencies of filter and amplifier 16 and filter and amplifier 35 so that when this signal is added to the output signal from filter and amplifier 35 in mixer 36 the resulting signal is of the same frequency as the impulse noise disturbance present in filter and amplifier 17. The predetermined phase relationship of the control signal acts to regulate the phase of the cancellation signal developed in mixer 36 so that it is 180° out-of-phase with the impulse noise disturbance coupled to summing circuit 18 from filter and amplifier 17. The two signals coupled to summing circuit 18 are of the same frequency, equal in magnitude but of opposite phase so that the impulse noise disturbance is cancelled or substantially reduced in summing circuit 18.

The noise cancellation system of FIG. 1 works very well in an environment where no signal are present in the passband of filter and amplifier 35. However, if this passband falls in an adjacent channel, as may happen in crowded communications channels, any signal on these channels will be coupled to the desired channel through summing circuit 18. In order to achieve cancellation in systems where the communications receiver is operating in crowded portions of the frequency spectrum, the circuit of FIG. 2 can be used. Portions of FIG. 2 which are identical to those of FIG. 1 have the same reference numerals.

Figure 2:
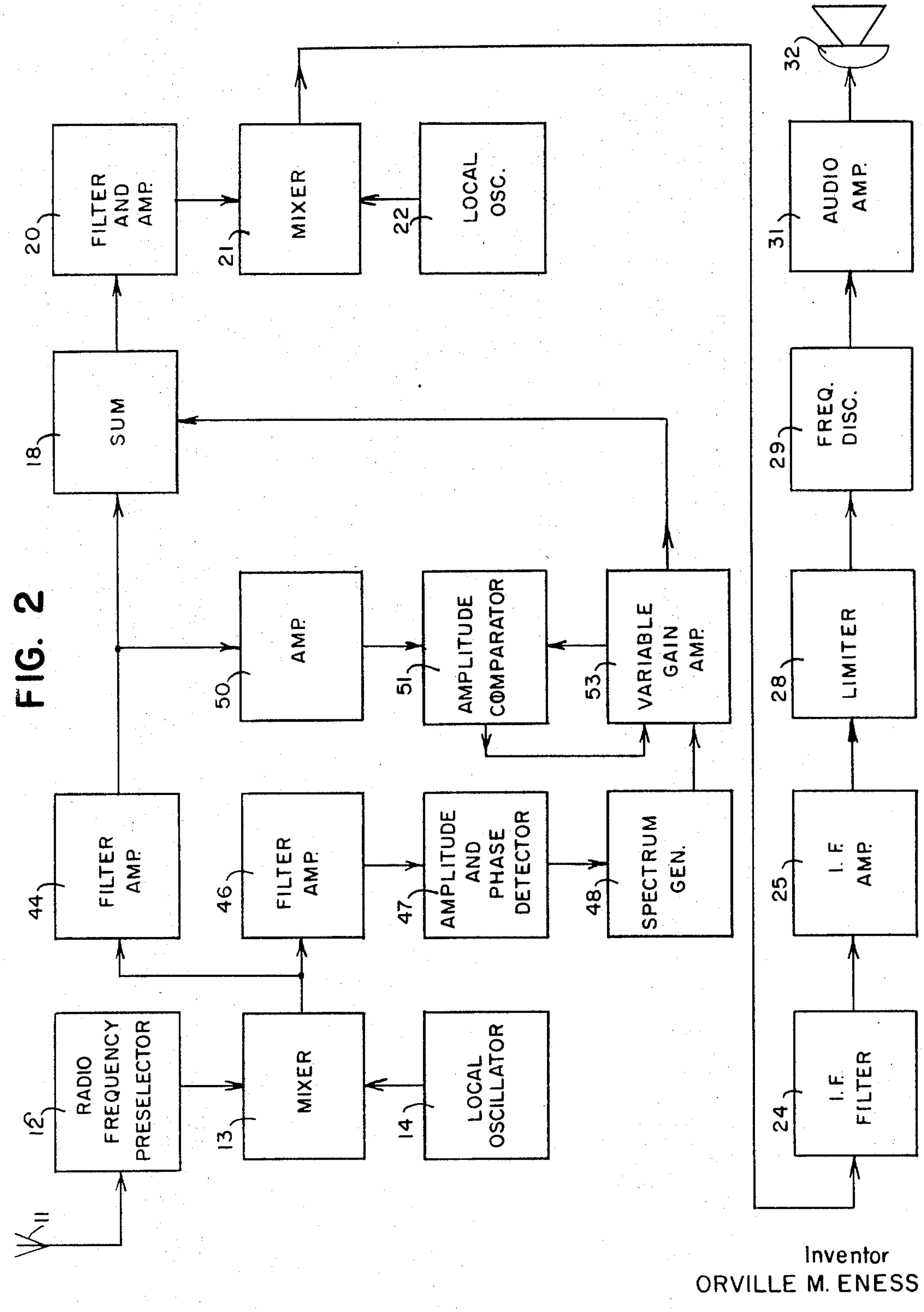
FIG. 2 is a block diagram of another embodiment of the system of FIG. 1.

In FIG. 2 filter amplifier 44 couples the signal from mixer 13 to summing circuit 18. The signal from mixer 13 is also coupled to amplitude and phase detector 47 through filter amplifier 46. Amplitude and phase detector 47 is responsive to impulse noise which is above a predetermined magnitude in a manner similar to amplitude and phase detector 40 of FIG. 1 to develop a control signal which has a predetermined phase relationship with the impulse noise disturbance. The control signal from amplitude and phase detector 47 is applied to spectrum generator 48. Spectrum generator 48 is responsive to the control signal to develop a cancellation signal having a spectrum which is the same as the spectrum of the impulse noise signal from filter and amplifier 44. The phase of the cancellation signal is determined by the control signal.

The cancellation signal is coupled to summing circuit 18 and amplitude comparator 51 through variable gain amplifier 53. Amplifier 50 couples the impulse noise disturbance from filter amplifier 44 to amplitude comparator 51 to compare the amplitude of the cancellation signal and the impulse noise disturbance. Amplitude comparator 51 generates a signal which is applied to variable gain amplifier 53 to regulate the gain thereof to equalize the amplitude of the cancellation signal and the impulse noise disturbance.

The frequency retalionship of the cancellation signal is such that it is 180° out-of-phase with the impulse noise disturbance. The two signals are summed in summing circuit 18 so that the impulse noise disturbances are cancelled or reduced in magnitude. Spectrum generator 48 provides an internally generated adjacent channel which is always free of inteferring signals so that there can be no cross modulation from an adjacent channel.

Figure 3:
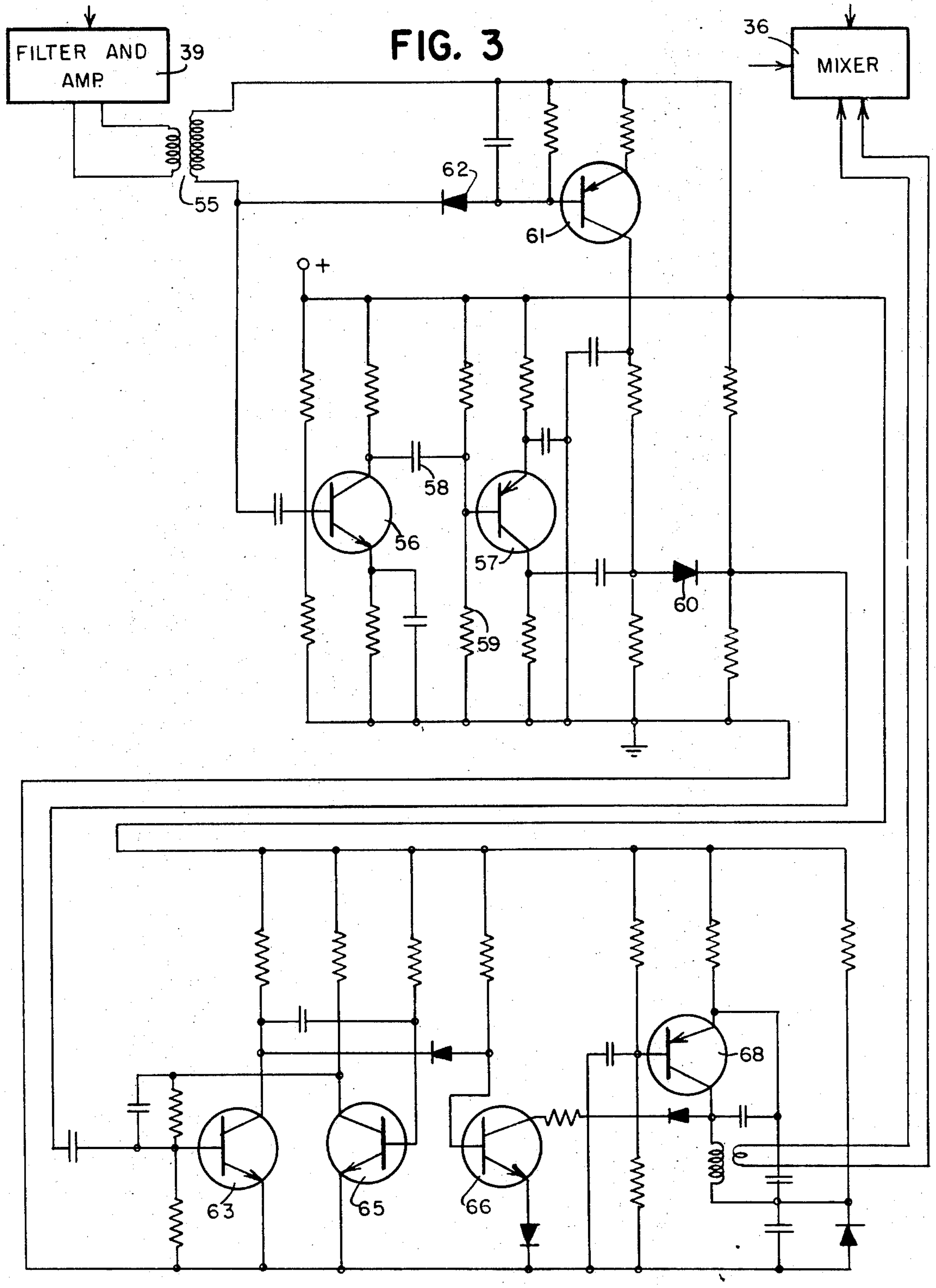
FIG. 3 is a partial block diagram and partial schematic of the embodiment of FIG. 1.

In FIG. 3 blocks 40 and 42 of FIG. 1 are shown in schematic form. The signal from filter and amplifier 39 is coupled to the amplitude and phase detector through transformer 55. The output of transformer 55 is coupled to transistor 56 which acts as a limiter. While transistor 56 is shown as a single transistor, a plurality of transistor stages may be incorporated to provide the necessary degree of limiting. The output signal from transistor 56 is a square wave with the zero crossings corresponding to the zero crossings of the impulse noise disturbance coupled to transformer 55. In order to actuate the keyed oscillator at the proper time, it is necessary to obtain output pulse signals which have a predetermined phase relationship to the zero crossings of the impulse noise disturbances.

The output signal from transistor 56 is coupled to transistor 57 through a differentiator consisting of capacitor 58 and resistor 59. The output pulse signals from the differentiator are amplifier by transistor 57 and coupled to keyed oscillator through diode 60. The output pulse signals from transisaor 57 are locked by diode 60 which is normally reversed biased. The input signal from transformer 55 is also coupled through diode 62 to transistor 61. When the amplitude of the signal of transformer 55 is sufficiently high diode 62 conducts in a forward direction to provide a bias current for transistor 61. With signals of low amplitude diode 62 will not conduct and transistor 61 will be biased to non-conduction. With transistor 61 biased to conduction a forward bias is applied to diode 60 to couple the pulse signals from transistor 57 to the keyed oscillator.

The keyed oscillator includes transistors 63 and 65 coupled as a one shut multivibrator which is triggered by the first pulse signal from diode 60. Subsequent pulse signals do not affect the operation of the one shot multivibrator during the time it is in its unstable state. The output of the one shot multivibrator keys on a quick start oscillator consisting of transistors 66 and 68 and their associated circuitry. The keyed oscillator provides the output signal which is coupled to mixer 36 as previously described.

Figure 4:
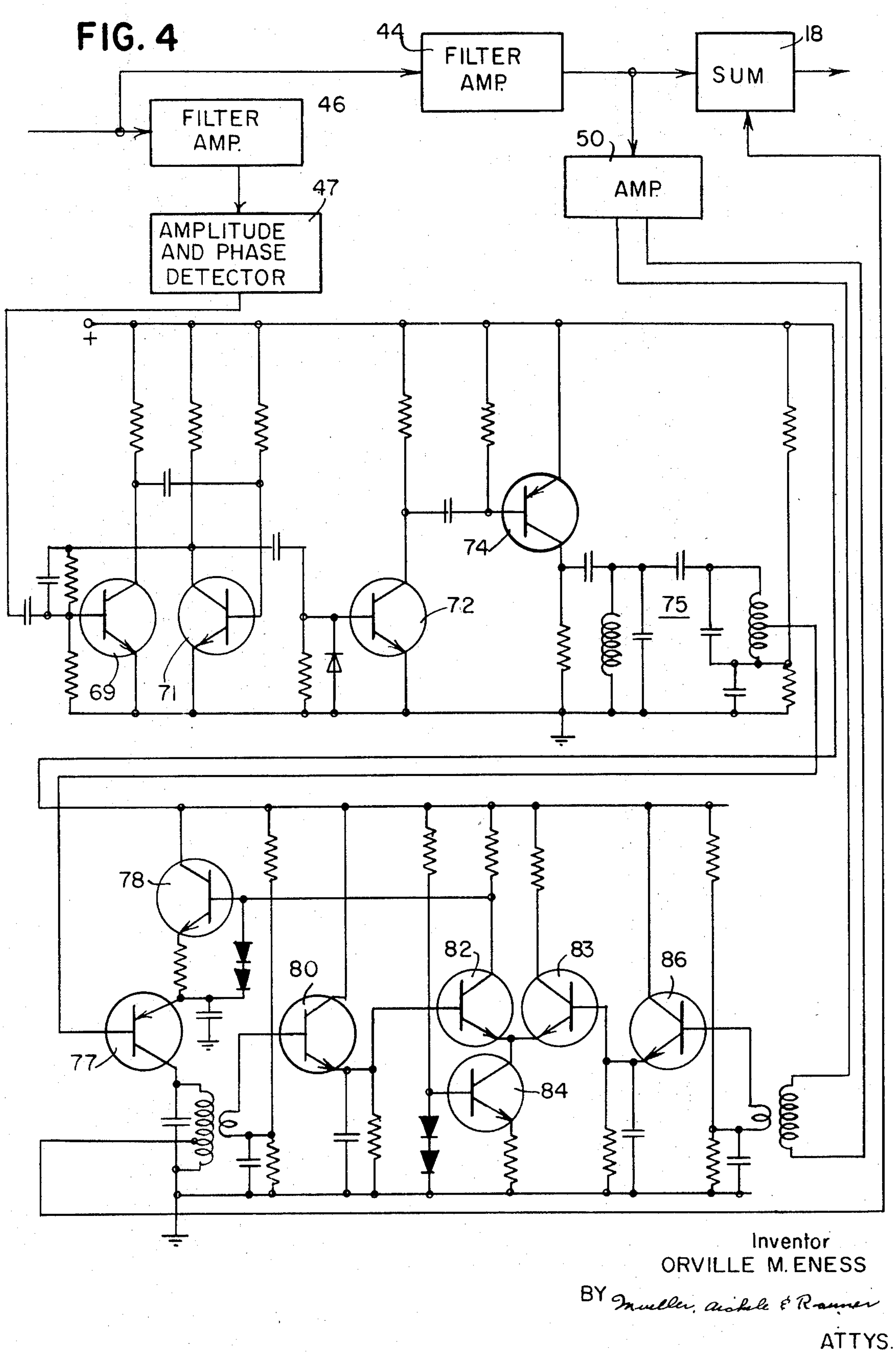
FIG. 4 is a partial block diagram and partial schematic of the embodiment of FIG. 2.

In FIG. 4 spectrum generator 48, amplitude comparator 51 and variable gain amplifier 53 of FIG. 2 are shown in schematic form. Amplitude and phase detector 47 of FIG. 2 has already been described in schematic form in connection with FIG. 3.

The output pulse signal from amplitude and phase detector 47 is coupled to transistors 69 and 71 which form a one shot multivibrator. The output of the one shot multivibrator is amplified in transistors 72 and 74 and filtered in filter 75 which determines the frequency spectrum of the cancellation signal. Transistors 69, 71, 72 and 74 together with filter 75 form the spectrum generator. The output from filter 75 is coupled to transistor 77 which acts as a variable gain amplifier. The output of transistor 77 is coupled to summing circuit 18.

The output of amplifier 50 is coupled to transistor 86 which acts as an amplitude detector and amplifier. The output of amplifier 86 is coupled to a differential amplifier consisting of transistors 82, 83 and 84 and their associated circuitry. The other input to the differential amplifier is the output of transistor 77 which is coupled to the differential amplifier through transistor 80. The differential amplifier develops a control signal, the magnitude of which depends upon the difference in amplitude between the output of the signal spectrum generator and the noise impulse appearing in the signal circuit. This control cirnal is applied to transistor 77 through transistor 78 to vary the gain of transistor 77 in a manner which equalizes the output signal from the spectrum generator and the noise impulse from amplifier 50.

Thus a noise cancellation system has been shown which cancels or reduces the impulse noise in a communications receiver. By using cancellation instead of blanking techniques sideband splatter is eliminated. In one form of the receiver an internally generated adjacent channel is used to develop the cancellation signals.

I claim:

1. A noise cancellation system for use in a signal wave receiver, including in combination, a receiver input portion for receiving a signal wave which may include impulse noise signals, impulse noise detection means including output means and amplitude and phase detection means coupled to said receiver input portion, said amplitude and phase detection means being responsive to impulse noise signals above a predetermined amplitude to develop a control signal and to synchronize said control signal so that said control signal has a predetermined phase relationship to said impulse noise signals, cancellation signal generation means coupled to the said output means of said impulse noise detection means and to said receiver input portion, said cancellation signal generation means being responsive to said control siganl and said impulse noise signals to generate a cancellation signal having substantially the same amplitude and frequency spectrum as said impulse noise signals, said cancellation signal generation means further being responsive to said predetermined phase relationship of said control signal to control the phase of said cancellation signal so that said cancellation signal is substantially 180° out-of-phase with said impulse noise disturbance, and summing means coupled to said receiver input portion to the output of said cancellation signal generation means for summing said impulse noise disturbance and said cancellation signal whereby the amplitude of said impulse noise disturbance is reduced.

2. The noise cancellation system of claim 1 wherein, said cancellation signal generation means includes spectrum generation means coupled to said output means of said impulse noise detection means, and said spectrum generation means being responsive to said control signal to develop said cancellation signal having a frequency spectrum substantially the same as the frequency spectrum of an impulse noise signal appearing at said input portion of the receiver, with said cancellation signal being substantially 180° out-of-phase with said impulse noise signal, and circuit means coupling the output of said spectrum generation means to the input of said summing means for applying said noise cancellation signal thereto.

3. The noise cancellation signal of claim 2 wherein, said circuit means includes automatic gain control means coupling the output of said spectrum generation means to the input of said summing means, said automatic gain control means also being coupled to said receiver input portion, said automatic gain control system being responsive to the amplitude of said impulse noise signal to regulate the gain of said circuit means so that said noise cancellation signal being applied to said summing means is subtantially equal in amplitude to said impulse noise signal.

4. The noise cancellation system of claim 3 wherein, said automatic gain control means includes a variable gain amplifier for amplifying said noise cancellation signal having input, output and control electrodes; said input electrode being coupled to said spectrum generation means, said output electrode being coupled to said summing means, differential amplifier means having one input terminal coupled to said receiver input portion and another input terminal coupled to said output electrode of the variable gain amplifier and an output terminal connected to said control electrode, said differential amplifier acting to develop an automatic gain control signal at said output terminal in response to the difference in amplitude between said impulse noise signal and said amplified noise cancellation signal, said variable gain amplifier being responsive to said automatic gain control signal applied to said control electrode to change its gain so that the amplitude of said amplified noise cancellation signal is substantially equal to the amplitude of said impulse noise signal.

5. The noise cancellation system of claim 2 wherein said amplitude and phase detection means includes limiting means coupled to said receiver input portion, said limiting means being responsive to said impulse noise signal to develop a square wave therefrom, differentiation means coupled to said limiting means for developing pulse signals of alternate polarities at each zero crossing of said square wave, and first diode means coupling said differentiation means to said cancellation signal generation means for applying said pulse signals of one polarity of said alternate polarities thereto.

6. The noise cancellation system of claim 5 wherein, said amplitude and phase detection means further includes bias means coupled to said first diode means for applying a reverse bias potential thereto, second diode means coupled to said receiver input portion and to said bias means for applying impulse noise signals greater than said predetermined magnitude thereto, said bias means being responsive to said noise impulse signal applied thereto to change said reverse bias potential on said first diode means to a forward bias potential whereby said pulse signals are applied to said noise cancellation signal generation means.

7. The noise cancellation system of claim 2 wherein, said spectrum generation means includes multivibrator circuit means coupled to said amplitude and phase detection means, said multivibrator circuit means being responsive to said control signal to develop a signal pulse for each impulse noise signal, and filter means coupled to said multivibrator circuit means for filtering said signal pulse to determine the frequency components thereof, said filter means having a pass band substantially the same as said receiver input portion.

8. The noise cancellation system of claim 1 wherein said input portion includes a first bandpass filter having a first center frequency for passing said signal wave including said impulse noise signals, said cancellation signal generation means includes a second bandpass filter having a second center frequency different from said first center frequency for passing said impulse noise signal, oscillator means having an output signal with a frequency equal to the difference between said first and second center frequencies coupled to said amplitude and phase detection means and being responsive to said control signal to develop said output signal, mixer means coupled to said second bandpass filter and said oscillator means and being responsive to said impulse noise signal and said output signal to develop said noise cancellation signal, said mixer being coupled to said summing means for applying said cancellation signal thereto.

9. The noise cancellation system of claim 8 wherein said amplitude and phase detection means includes limiting means coupled to said receiver input portion, said limiting means being responsive to said impulse noise signal to develop a square wave therefrom, differentiation means coupled to said limiting means for developing pulse signals of alternate polarities at each zero crossing of said square waves, and first diode means coupling said differentiation means to said oscillator means for applying said pulse signals of one polarity of said alternate polarities thereto.

10. The noise cancellation system of claim 9 wherein said amplitude and phase detection means further includes bias means coupled to said first diode means for applying a reverse bias potential thereto, second diode means coupled to said receiver input portion and to said bias means for applying impulse noise signals greater than a predetermined magnitude thereto, said bias means being responsive to said noise impulse signals applied thereto to change said reverse bias potential on said first diode means to a forward bias potential whereby said pulse signals are applied to said oscillator means.

References Cited

UNITED STATES PATENTS

| | | | |
|---|---|---|---|
| 2,028,841 | 1/1936 | Murray | 325—301 |
| 2,200,613 | 5/1940 | Zuccarello | 325—475 |
| 2,113,212 | 4/1938 | Landon | 325—476 |
| 2,450,818 | 10/1948 | Vermillion | 325—476 |
| 3,177,489 | 4/1965 | Saltzberg | 325—476X |

ROBERT L. GRIFFIN, Primary Examiner

R. S. BELL, Assistant Examiner

U.S. Cl. X.R.

325—475